United States Patent
Uehara (10) Patent No.: US 9,616,742 B1
(45) Date of Patent: Apr. 11, 2017

(54) VEHICLE GRILL SHUTTER SYSTEM

(71) Applicant: Nissan North America, Inc., Franklin, TN (US)

(72) Inventor: Takafumi Uehara, México City (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/928,822

(22) Filed: Oct. 30, 2015

(51) Int. Cl.
*B60K 11/08* (2006.01)
*B60K 11/04* (2006.01)

(52) U.S. Cl.
CPC ............ *B60K 11/085* (2013.01); *B60K 11/04* (2013.01)

(58) Field of Classification Search
CPC ........................................ B60K 11/08–11/085
See application file for complete search history.

(56) References Cited

U.S. PATENT DOCUMENTS

| 2012/0132474 A1* | 5/2012 | Charnesky | B60K 11/085 180/68.1 |
| 2013/0223980 A1* | 8/2013 | Pastrick | F01D 5/00 415/1 |
| 2015/0343892 A1* | 12/2015 | Kolhouse | B60K 11/085 165/287 |

* cited by examiner

*Primary Examiner* — Erez Gurari
(74) *Attorney, Agent, or Firm* — Global IP Counselors, LLP (57) ABSTRACT

A vehicle grill shutter system comprising at least one grill shutter and a controller. The grill shutter is movably coupled to a vehicle at a location forward of a radiator of the vehicle. The grill shutter comprises first and second portions. The first portion has a first surface and includes a first material having a first porosity, and the second portion has a second surface and includes a second material having a second porosity which is less porous than the first porosity. The controller is configured to operate the grill shutter, in response to a detected vehicle condition pertaining to the vehicle, to move between a first position at which the first surface is oriented transverse to a flow direction of air entering a grill of the vehicle toward the radiator and a second position at which the second surface is oriented transverse to the flow direction.

17 Claims, 6 Drawing Sheets

VEHICLE GRILL SHUTTER SYSTEM

BACKGROUND

Field of the Invention

The present invention generally relates to a vehicle grill shutter system. More particularly, the present invention relates to a vehicle grill shutter system having selectably positionable grill shutters including surfaces of different porosities to alternatively provide greater protection or greater air flow to components in the engine compartment.

Background Information

In a vehicle having air conditioning, the condenser is typically positioned in the vehicle engine compartment directly behind the grill that is mounted in the front fascia of the vehicle. Therefore, it is possible for stones or other debris that are kicked up by the vehicle itself or by other vehicles travelling in front of the vehicle to pass through the openings in the vehicle grill and possibly damage the condenser.

In recent years, some vehicles have been equipped with different types of arrangements which provide increased protection to components in the vehicle engine department from such flying debris. For example, some vehicles can be equipped with after-market plastic guards that are installed behind the grill and in front of the condenser. These plastic guards typically have openings that allow air to pass to the components in the engine compartment, especially when the vehicle is travelling in a forward direction. However, these screens may not have sufficient strength to withstand continuous contact with debris, and thus may eventually become damaged and need replacement.

Alternatively, some vehicle can be equipped with shutter arrangements that can be closed to provide additional protection and open when the additional protection is unnecessary. However, these types of shutter arrangements merely include panels that can either be placed in a closed position that block the openings in the grill or an open position that do not impede the openings in the grill. Therefore, these shutter arrangements essentially provide no additional protection to the components in the engine compartment while in the open position, and block air flow to the engine compartment while in the closed position.

Accordingly, a need exists for an improved vehicle grill shutter system.

SUMMARY

In accordance with one aspect of the present invention, a vehicle grill shutter system comprises at least one grill shutter and a controller. The grill shutter is movably coupled to a vehicle at a location forward of a radiator of the vehicle. The grill shutter comprises first and second portions. The first portion has a first surface and includes a first material having a first porosity, and the second portion has a second surface and includes a second material having a second porosity which is less porous than the first porosity. The controller is configured to operate the grill shutter, in response to a detected vehicle condition pertaining to the vehicle, to move between a first position at which the first surface is oriented transverse to a flow direction of air entering a grill of the vehicle toward the radiator and a second position at which the second surface is oriented transverse to the flow direction.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the disclosed embodiments are provided for illustration only and not for the purpose of limiting the invention as defined by the appended claims and their equivalents.

Figure 1:
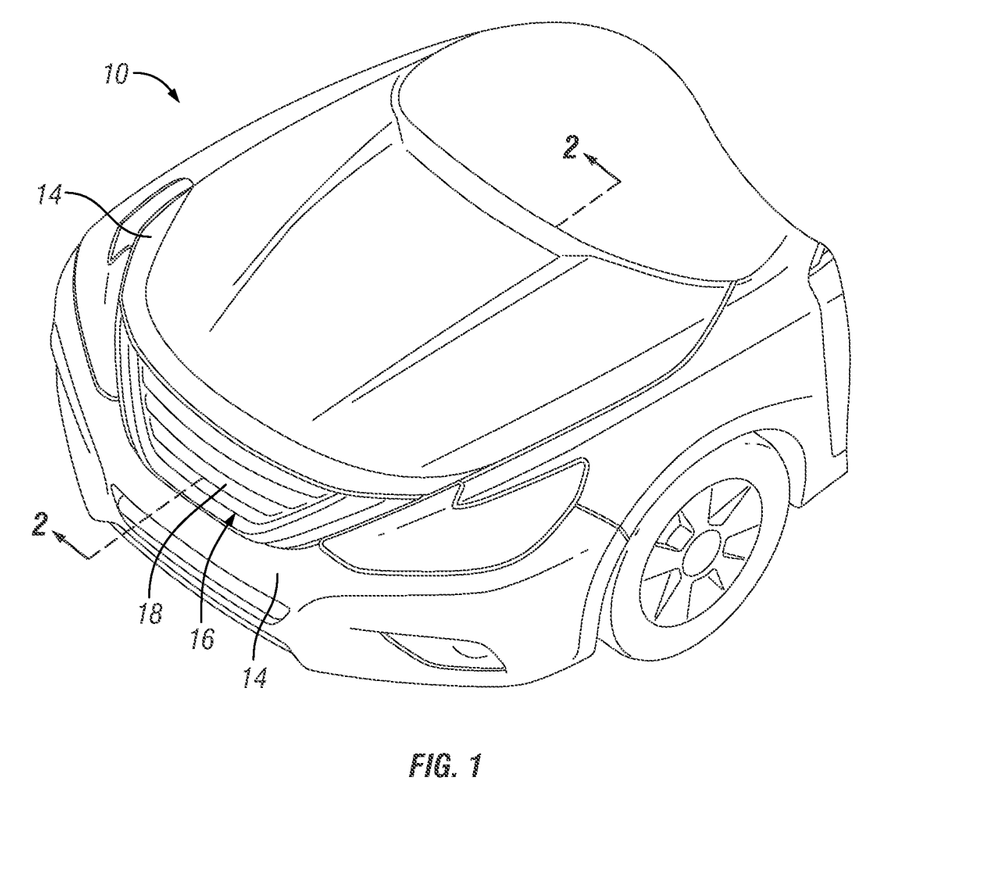
FIG. 1 is a diagrammatic view illustrating an example of a vehicle equipped with a vehicle grill shutter system according to a disclosed embodiment.
Figure 2:
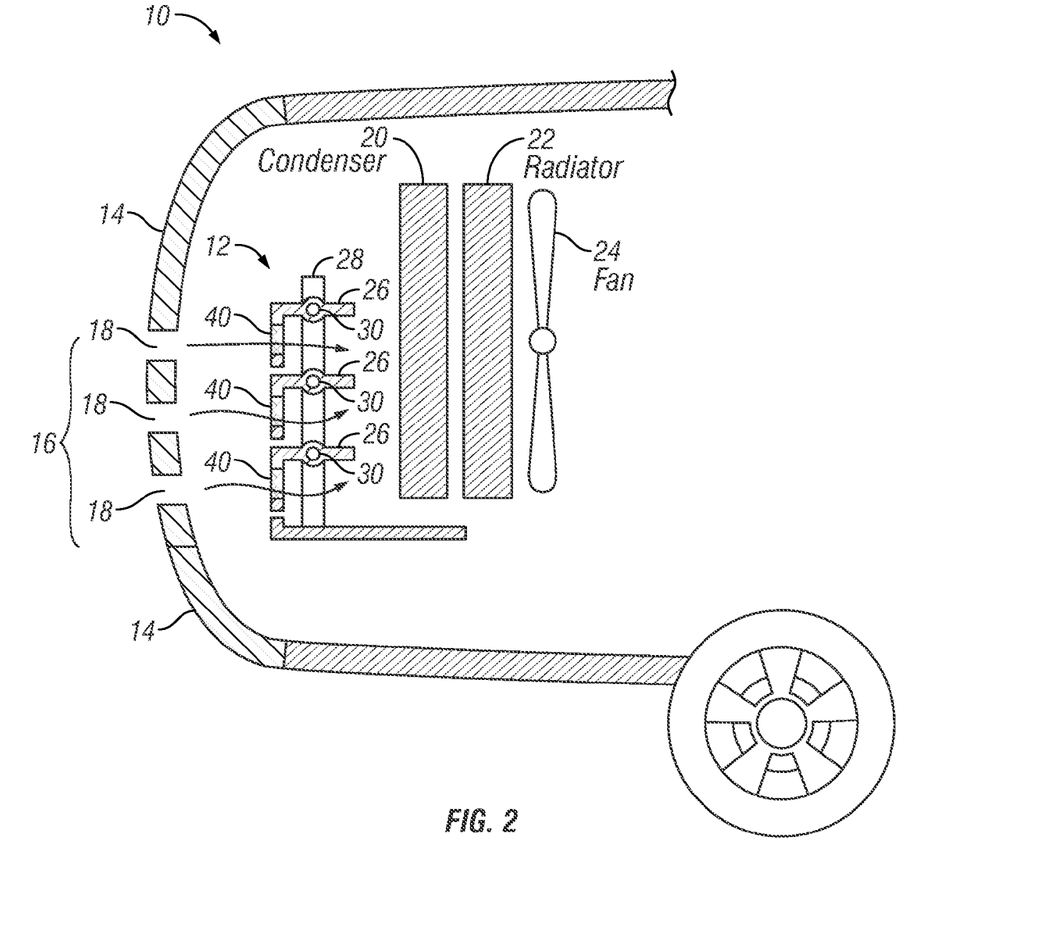
FIG. 2 is a cross-sectional view of the front of the vehicle taken along lines 2-2 in FIG. 1 to illustrate exemplary components of the vehicle grill shutter assembly of the vehicle grill shutter system with the vehicle grill shutters in a first or open position.

FIGS. 1 and 2 illustrate an example of a vehicle 10 equipped with a vehicle grill shutter system including a vehicle grill shutter assembly 12 according to a disclosed embodiment. The vehicle 10 can be an automobile, SUV, truck, van or any other type of vehicle 10. The vehicle 10 includes a front fascia 14 and a grill 16. The grill 16 has openings 18, such as slotted opening, through which air can pass, especially when the vehicle 10 is travelling in a forward direction. The grill 16 is mounted to the front fascia 14 in any suitable manner as understood in the art. The vehicle 10 in this example further includes a condenser 20 that is connected to the HVAC system (not shown) of the vehicle 10, a radiator 22 and a fan 24. Typically, the radiator 22 is disposed behind the condenser 20, and the fan 24 is disposed behind the radiator 22. In this example, grill shutter assembly 12 is disposed between the grill 16 and the condenser 20.

Figure 3:
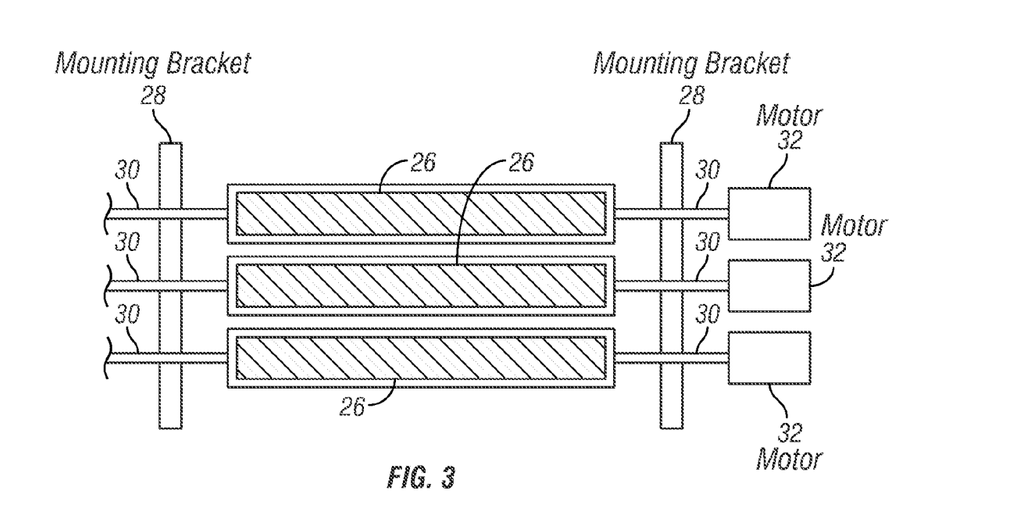
FIG. 3 is a front view of the vehicle grill shutter assembly shown in FIG. 2.

As shown in more detail in FIG. 3, the grill shutter assembly 12 includes a plurality of grill shutters 26. A grill shutter 26 can be made of, for example, plastic, composite, stainless steel or any other suitable material as understood in the art. Each of the grill shutters 26 is pivotally mounted to mounting brackets 28 by a support bar 30. A support bar 30 can be made of any suitable material, such as stainless steel. Also, a support bar 30 can be configured as a single bar that extends between the brackets 28, or a plurality of bars that are coupled to each other and to a grill shutter 26, to pivotally mount the grill shutter 26 to the mounting brackets 28. The mounting brackets 28 can be coupled to the frame of the vehicle 10, or to any other suitable component of the vehicle 10, in any suitable manner as understood in the art.

In the illustrated example, the grill shutter assembly 12 includes three grill shutters 26. However, the grill shutter assembly 12 can include any number of grill shutters 26 as necessary to extend along the entire vertical height of the grill 16 or a desired portion of the vertical height of the grill 16. Furthermore, the grill shutters 26 are aligned with or substantially aligned with the openings 18 in the grill 16 as illustrated. The grill shutter assembly 12 further includes a plurality of motors 32. Each of the motors 32 is coupled to a respective support bar 30 to rotate the respective support bar 30 to pivot a respective grill shutter 26 as discussed herein.

Figure 4:
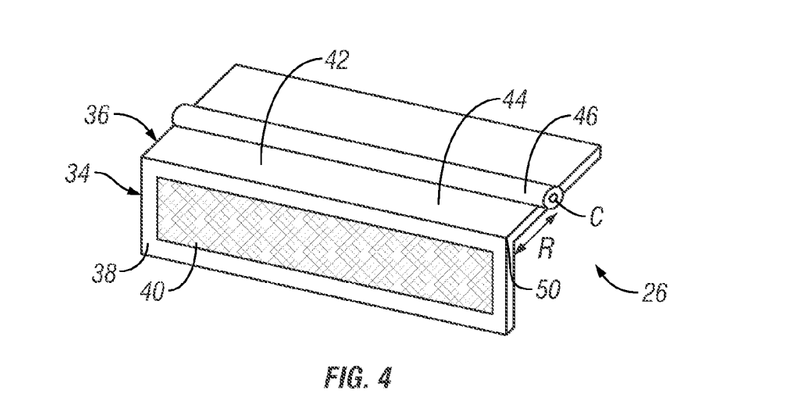
FIG. 4 is a perspective view of an exemplary vehicle grill shutter of the vehicle grill shutter assembly shown in FIG. 2.
Figure 5:
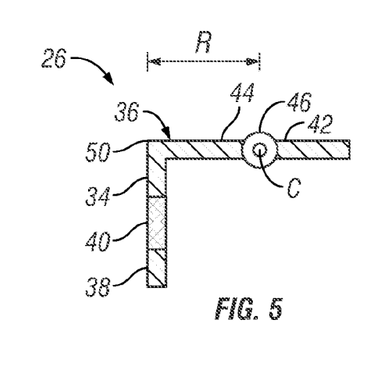
FIG. 5 is a cross-sectional view of the vehicle grill shutter taken along lines 5-5 in FIG. 4.
Figure 6:
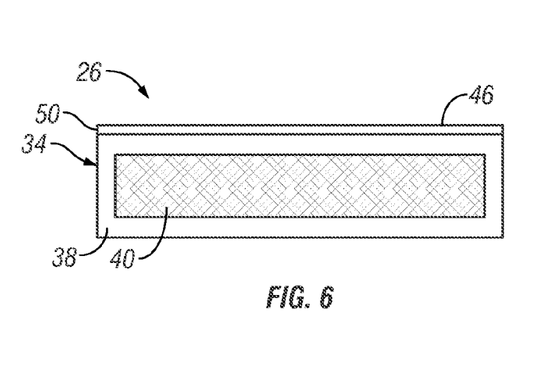
FIG. 6 is a front view of the vehicle grill shutter shown in FIG. 4.

As shown in more detail in FIGS. 4 through 6, each grill shutter 26 comprises a first portion 34 and a second portion 36. The first portion 34 and the second portion 36 extend transverse to each other. In this example, the first portion 34 and the second portion 36 extend substantially normal to each other. However, the first portion 34 and the second portion 36 can extend at any angle with respect to each other that is suitable for achieving the features discussed herein.

The first portion 34 has a first surface 38 and includes a first material 40 having a first porosity, and the second portion 36 has a second surface 42 and includes a second material 44 having a second porosity which is less porous than the first porosity. In this example, the first material 40 is a mesh material, such as a stainless steel wire mesh material, and the second material 44 is a solid material, such as the material of the grill shutter 26 which can be plastic, composite, stainless steel and so on as discussed above. However, the first material 40 and the second material 44 can each be made of any suitable material as long as the first material 40 has the first porosity and the second material 44 has the second porosity which is less porous than the first porosity.

As further illustrated, each grill shutter 26 further includes a pivot portion 46. The pivot portion 46 can be formed integrally with the second portion 36 and made of the same material as the second portion 36, or can be coupled to the second portion 36 in any suitable manner. The pivot portion 46 includes an opening 48 configured to receive a support bar 30 and thus pivotally couple the second portion 36 to the mounting brackets 28. Thus, the pivot portion 46 via the support bar 30 pivotally couples the grill shutter 26 to the vehicle 10 at a location forward of the condenser 20 and the radiator 22 of the vehicle 10.

As can further be appreciated from FIGS. 2 through 5, the second portion 36 is configured to pivot about the pivot portion 46, and the first portion 34 is positioned at a radial distance R from the axial center C of the opening 48 of the pivot portion 46 corresponding to a section of the second portion 36 between the axial center C of the opening 48 of the pivot portion 46 and a location 50 at which the first portion 34 meets the second portion 36. Thus, the first portion 34 is configured to orbit about the axial center C of the pivot portion 46 at an orbital distance based on and, in particular, corresponding to the radial distance R.

Figure 9:
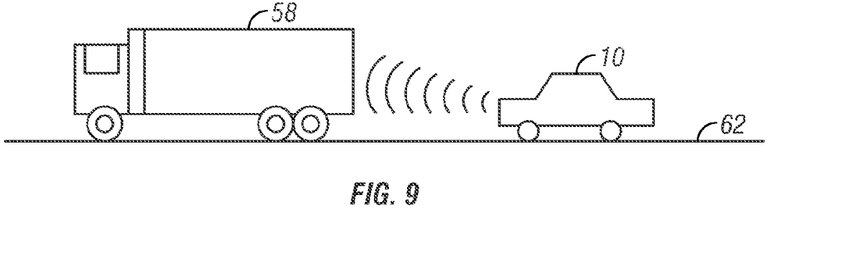
FIG. 9 is a diagrammatic view illustrating the vehicle shown in FIG. 1 travelling behind another vehicle on a terrain, such as a road.

Thus, when one or more of the grill shutters 26 is positioned in the open position as shown in FIG. 2 and the vehicle 10 is travelling forward, air can pass through the grill 16 and the more porous first material 40 (e.g., a mesh) of the grill shutters 26 in the open positioned to cool the condenser 20 and the radiator 22. On the contrary, when one or more of the grill shutters 26 is positioned in the closed position as shown in FIG. 9 and the vehicle 10 is travelling forward, air can pass through the grill 16 but is obstructed by the less porous second material 44 (e.g., solid plastic material) of the grill shutters 26 in the position to provide additional protection to the condenser 20.

Figure 7:
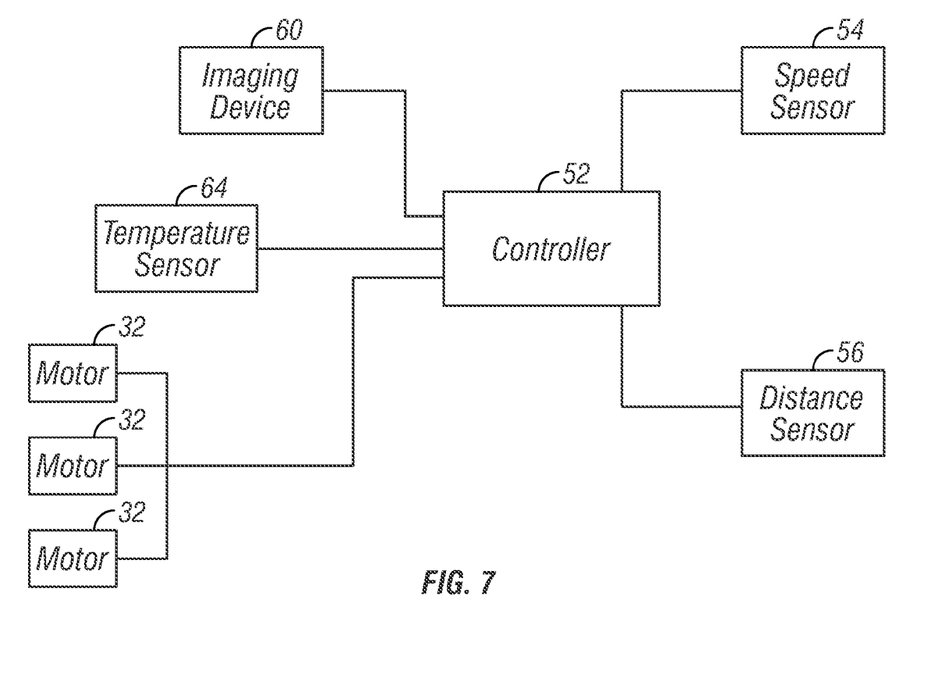
FIG. 7 is a block diagram illustrating an example of components of the vehicle grill shutter system according to a disclosed embodiment.

FIG. 7 is a block diagram illustrating additional components associated with the vehicle grill shutter system. As shown, the vehicle grill shutter system includes a controller 52 that is configured and programmed to control the each of the motors 32 to rotate a respective support bar 30 to pivot a respective grill shutter 26 as discussed herein. The controller 52 can be part of the controller of the vehicle 10 or a separate controller, and preferably includes a microcomputer with a control program that controls the grill shutters 26 of the vehicle grill shutter assembly 12 as, for example, discussed below with regard to the flowchart in FIG. 8. The controller 52 includes other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controller 52 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. Furthermore, the controller 52 can communicate with the other components of the vehicle 10 discussed herein in any suitable manner as understood in the art.

As further shown in FIG. 7, the controller 52 is configured to receive information from components of the vehicle 10 such as a speed sensor 54 which senses the speed of the vehicle 10, and a distance sensor 56 which senses the distance from the front of the vehicle 10 to another vehicle 58 (see FIG. 9) or object that the vehicle 10 is following. The controller 52 is also configured to receive information from an imaging device 60 on the vehicle 10 which operates to capture images surrounding the vehicle 10, such as images of the terrain 62 (see FIG. 9), such as the road upon which the vehicle 10 is travelling. The imaging device 60 can include a camera, such as a CCD camera, and other type of image capturing devices as understood in the art.

The controller 52 is further configured to receive information from a temperature sensor 64 on the vehicle which senses the temperature of the fluid in the HVAC system of the vehicle 10, such as the temperature of the fluid in the radiator 22. As understood in the art, the controller 52 can receive information from other sensors that enable to perform the operations as discussed herein.

Figure 10:
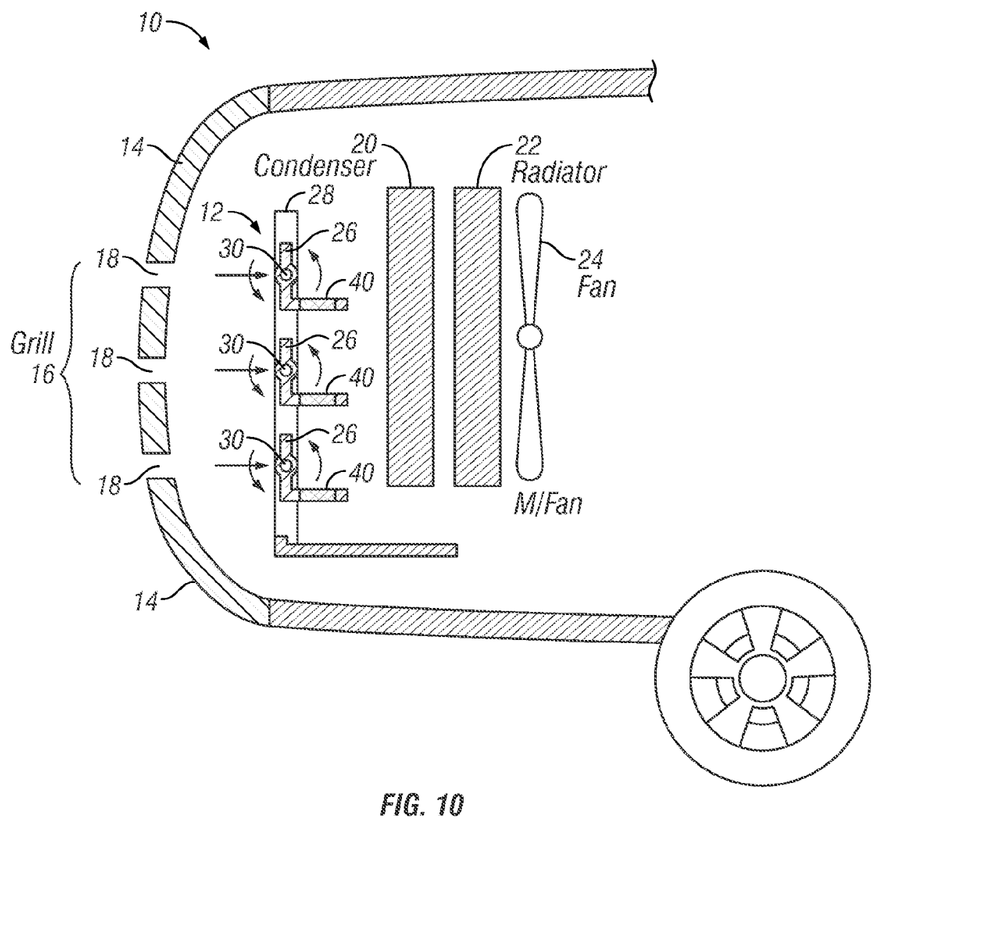
FIG. 10 is a cross-sectional view of the front of the vehicle taken along lines 2-2 in FIG. 1 to illustrate exemplary components of the vehicle grill shutter assembly of the vehicle grill shutter system with the vehicle grill shutters in a second or closed position.

As will now be discussed with reference to FIG. 8, the controller 52 is further programmed and configured to control the motors 32 based on the information received from any or all of the sensors described above. Upon beginning the processing, the controller 52 monitors the sensors discussed above in step 100. In step 102, the controller 52 evaluates the information from, for example, the imaging device 60 to assess the condition of the terrain 62 upon which the vehicle 10 is travelling. If the controller 52 determines that the condition of the terrain 62 is less than predetermined threshold, which indicates that the terrain 62 is rough and includes, for example, much debris such as stones and so on, the processing will continue to step 104. In step 104, the controller 52 controls the motors 32 to pivot one or more of the grill shutters 26 to the closed position as shown in FIG. 10. Thus, the controller operates one or more of the grill shutters, in response to a detected vehicle condition pertaining to the vehicle, to move from a first position at which the first surface is oriented transverse to a flow direction of air entering the grill of the vehicle toward the radiator and a second position at which the second surface is oriented transverse to the flow direction. The processing then returns to step 100 and continues as discussed above.

However, if the controller 52 determines in step 102 that the condition of the terrain 62 is at least equal to the predetermined threshold, which indicates that the terrain 62 is acceptable, the processing will continue to step 106. In step 106, the controller 52 determines the speed at which the vehicle 10 is travelling based on the information received from, for example, the speed sensor 54. If the controller 52 determines that the speed of the vehicle 10 is at least equal to a predetermined speed threshold, the processing will continue to step 108.

In step 108, the controller 52 determines the distance between the front of the vehicle 10 and the other vehicle 58 travelling in front of the vehicle based on the information received from, for example, the distance sensor 56. If the controller 52 determines that the distance is less than a predetermined distance threshold, the processing will continue to step 110. Also, in step 100, the controller 52 can evaluate what type of vehicle (e.g., a large truck, an automobile, etc.) the other vehicle 58 is based on information received from, for example, the distance sensor 56, the imaging device 60, or both. The controller 52 can adjust the predetermined distance threshold based on the vehicle type. For instance, the controller 52 can set a higher threshold when the other vehicle 58 is a large truck since the likelihood of a large truck kicking up debris may be higher than the likelihood of a small vehicle kicking up debris. Hence, the controller 52 may thus return a "Yes" or "No" condition from step 108 based on whether or not the type of other vehicle 58 corresponds to a predetermined vehicle type.

In step 110, the controller 52 determines the temperature of the cooling system fluid based on the information received the temperature sensor 64. If the controller 52 determines that the temperature of the cooling system fluid is less than a predetermined temperature threshold, the processing will continue to step 104. However, if the controller 52 determines that any of the conditions assessed in steps 106, 108 or 110 result in a "No" decision, the processing continues to step 112 where the controller 52 controls one or more of the grill shutters 26 to remain in or enter the opened position as shown, for example, in FIG. 2.

Thus, in performing steps 106, 108 and 110, the controller 52 has determined whether it is acceptable to control one or more of the grill shutters 26 to pivot to the closed position as shown in FIG. 9. In other words, the controller 52 has determined in step 106 that the vehicle 10 is travelling at a speed which increases the likelihood of damage to the first material 40, and possibly to the condenser 20, due to debris such as rocks entering through the openings 18 in the grill 16. The controller 52 has also determined in step 108 that the vehicle 10 is travelling at a distance behind another vehicle 58 which increases the likelihood of damage to the first material 40, and possibly to the condenser 20, due to debris such as rocks being kicked up by the other vehicle 58 and entering through the openings 18 in the grill 16. However, the controller 52 has also confirmed in step 110 that the temperature of the cooling system fluid is low enough so that any diminished cooling air flow caused by closing one or more of the grill shutters 26 will not result in the temperature of the cooling system fluid overheating.

Figure 8:
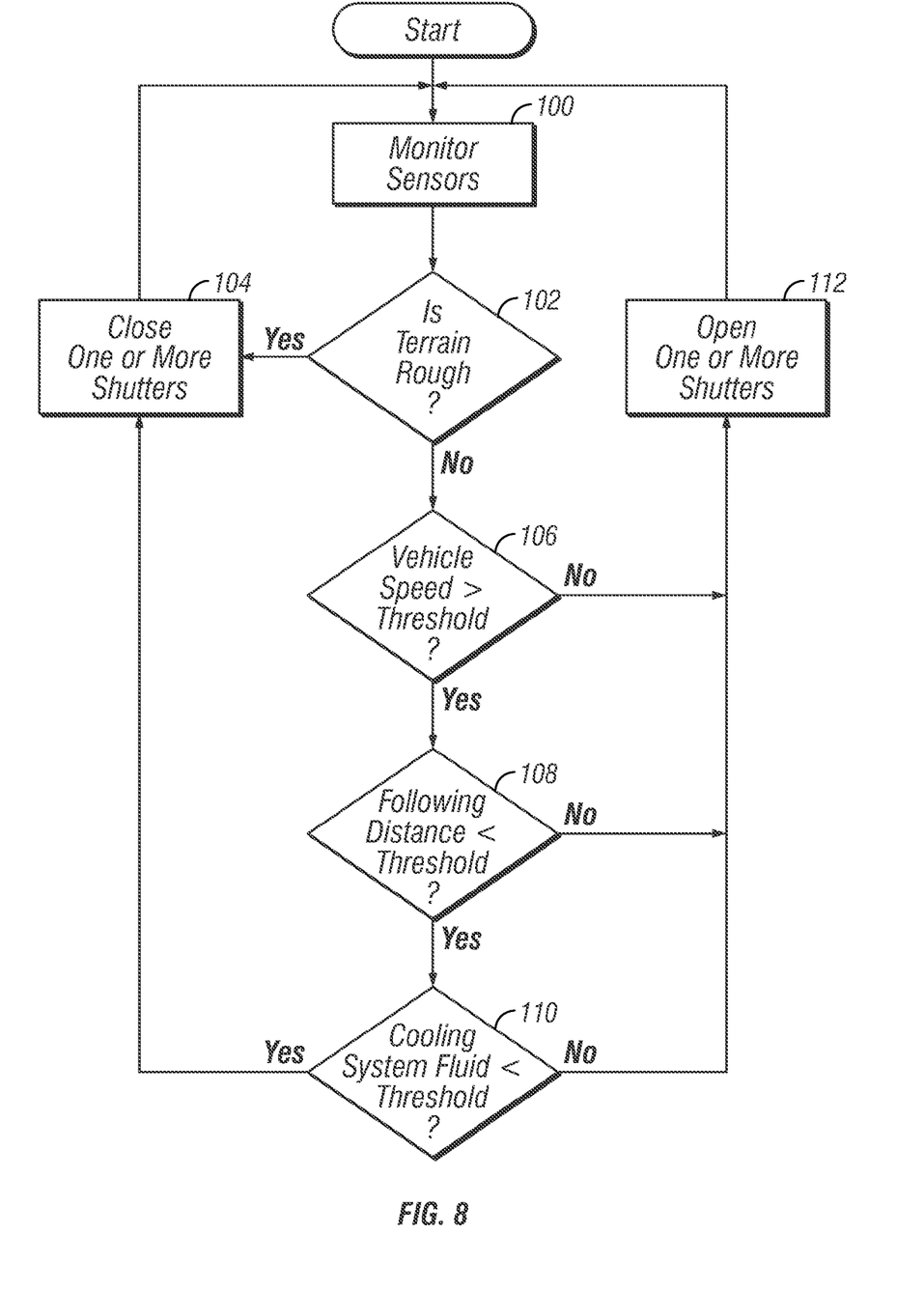
FIG. 8 is a flowchart illustrating exemplary operations that can be performed by the vehicle grill shutter system according to a disclosed embodiment.

Naturally, as can be understood in the art, the processing shown in FIG. 8 is merely exemplary, and the controller 52 can perform steps 102, 106, 108 and 110 simultaneously or in any order. Furthermore, the controller 52 can operate to continue to processing 104 upon determining that a "Yes" condition exists in any of steps 102, 106, 108 and 110 to close one or more of the grill shutters 26 when any of those conditions exists, or any combination of those conditions exist. For instance, if the vehicle 10 is travelling in very cold weather, it may not be necessary for the controller 52 to assess the temperature of the cooling system fluid in step 110 to determine whether it is acceptable to close any or all of the grill shutters 26 since the temperature of the cooling system fluid will remain below the temperature threshold regardless of whether or not the grill shutters 26 are closed. Moreover, if the vehicle 10 is travelling very fast, it may not be necessary for the controller 52 to assess following distance in step 108 because the risk of damage due to stones or other debris may be high regardless of the distance at which the vehicle 10 is following the other vehicle 58. Similarly, if the vehicle 10 is travelling very fast, the amount of air entering the engine compartment of the vehicle 10 to cool the radiator 22 to maintain the temperature of the cooling system fluid at an acceptable level regardless of whether or not any or all of the grill shutters 26 are closed. Likewise, if the vehicle 10 is travelling very close behind the other vehicle 58, the risk of damage due to stones or other debris may be high regardless of the speed at which the vehicle 10 is following the other vehicle 58. Thus, it may not be necessary to assess the speed of the vehicle 10. Furthermore, since the vehicle 10 may only be travelling near to the other vehicle 58 for a brief period of time, it may not be necessary to monitor the temperature of the cooling system fluid, since any interruption of air flow due to the closing of one or more of the grill shutters 26 for such a short period of time may not increase the temperature of the cooling system fluid by any significant amount. Naturally, the controller 52 can be programmed to issue a warning, such as an audio warning, a visual warning, a haptic warning, or a combination of these types of warnings, to the driver of the vehicle 10 which indicates the risk of potential damage or an instruction to change driving conditions. Example of these instructions could be to maintain a greater distance from the other vehicle 58, reduce the speed of the vehicle 10 due to the road conditions and so on as understood in the art.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle grill shutter system comprising:
   at least one grill shutter movably coupled to a vehicle at a location forward of a radiator of the vehicle, the grill shutter comprising a first portion and a second portion, the first and second portions extending transverse to each other, the first portion having a first surface and including a first material having a first porosity, and the second portion having a second surface and including a second material having a second porosity which is less porous than the first porosity; and
   a controller configured to operate the grill shutter, in response to a detected vehicle condition pertaining to the vehicle, to move between a first position at which the first surface is oriented transverse to a flow direction of air entering a grill of the vehicle toward the radiator and a second position at which the second surface is oriented transverse to the flow direction.

2. A vehicle grill shutter system comprising:
   at least one grill shutter movably coupled to a vehicle at a location forward of a radiator of the vehicle, the grill shutter comprising a first portion and a second portion, the first portion having a first surface and including a first material having a first porosity, and the second portion having a second surface and including a second material having a second porosity which is less porous than the first porosity; and
   a controller configured to operate the grill shutter, in response to a detected vehicle condition pertaining to the vehicle, to move between a first position at which the first surface is oriented transverse to a flow direction of air entering a grill of the vehicle toward the radiator and a second position at which the second surface is oriented transverse to the flow direction, the detected vehicle condition pertaining to a distance of the vehicle from another vehicle in front of the vehicle, and the controller being configured to operate the grill shutter to move from the first position to the second position upon determining that the distance is less than a predetermined distance threshold.

3. The vehicle grill shutter system according to claim 2, wherein
   the controller is further configured to operate the grill shutter to move from the second position to the first position upon determining that the distance becomes at least equal to the predetermined distance threshold.

4. The vehicle grill shutter system according to claim 1, wherein
   the detected vehicle condition pertains to a speed of the vehicle, and the controller is configured to operate the grill shutter to move from the first position to the second position upon determining that the speed is at least equal to a predetermined speed threshold.

5. The vehicle grill shutter system according to claim 4, wherein
   the controller is further configured to operate the grill shutter to move from the second position to the first position upon determining that the speed becomes less than the predetermined speed threshold.

6. The vehicle grill shutter system according to claim 1, wherein
   the detected vehicle condition pertains to a temperature of fluid in the radiator, and the controller is configured to operate the grill shutter to move from the first position to the second position upon determining that the temperature is below a predetermined temperature threshold.

7. The vehicle grill shutter system according to claim 6, wherein
   the controller is further configured to operate the grill shutter to move from the second position to the first position upon determining that the temperature becomes at least equal to the predetermined temperature threshold.

8. The vehicle grill shutter system according to claim 1, wherein
   the detected vehicle condition pertains to a distance of the vehicle from another vehicle in front of the vehicle, a speed of the vehicle and a temperature of fluid in the radiator, and the controller is configured to operate the grill shutter to move from the first position to the second position upon determining that the distance is less than a predetermined distance threshold, the speed of the vehicle is at least equal to a predetermined speed threshold and the temperature is below a predetermined temperature threshold.

9. The vehicle grill shutter system according to claim 8, wherein
   the controller is further configured to operate the grill shutter to move from the second position to the first position upon determining at least one of the following:
   the distance becomes at least equal to the predetermined distance threshold;
   the speed becomes less than the predetermined speed threshold; and
   the temperature becomes at least equal to the predetermined temperature threshold.

10. The vehicle grill shutter system according to claim 1, wherein
    the detected vehicle condition pertains to a terrain condition of a terrain upon which the vehicle is travelling, and the controller is configured to operate the grill shutter to move from the first position to the second position upon determining that the terrain condition corresponds to a predetermined terrain condition.

11. The vehicle grill shutter system according to claim 1, wherein
the detected vehicle condition pertains to a type of other vehicle that is in front of the vehicle, and the controller is configured to operate the grill shutter to move from the first position to the second position upon determining that the type of other vehicle corresponds to a predetermined vehicle type.

12. The vehicle grill shutter system according to claim 1, wherein
the first material is a mesh material and the second material is a solid material.

13. The vehicle grill shutter system according to claim 1, further comprising
a plurality of the grill shutters, each being movably coupled to the vehicle at the location forward of the radiator of the vehicle.

14. The vehicle grill shutter system according to claim 13, wherein
the controller is configured to operate each of the grill shutters independently of each other, in response to the detected vehicle condition, to move between the first position and the second position.

15. A vehicle grill shutter comprising:
a first portion having a first surface and including a first material which is a mesh material having a first porosity;
a second portion extending transverse to the first portion, the second portion having a second surface and including a second material which is a solid material having a second porosity which is less porous than the first porosity; and
a pivot portion configured to pivotally couple the second portion to a vehicle at a location forward of a radiator of the vehicle.

16. The vehicle grill shutter according to claim 15, wherein
the first and second portions extend substantially normal to each other.

17. The vehicle grill shutter according to claim 15, wherein
the second portion is configured to pivot about an axial center of the pivot portion, and the first portion is positioned at a radial distance from the axial center of the pivot portion corresponding to a section of the second portion between the axial center of the pivot portion and a location at which the first portion meets the second portion such that the first portion is configured to orbit about the axial center of the pivot portion at an orbital distance based on the radial distance.

* * * * *